(12) United States Patent
Kathpal et al.

(10) Patent No.: US 9,851,908 B2
(45) Date of Patent: Dec. 26, 2017

(54) METHODS FOR MANAGING READ ACCESS OF OBJECTS IN STORAGE MEDIA AND DEVICES THEREOF

(71) Applicant: NetApp, Inc., Sunnyvale, CA (US)

(72) Inventors: Atish Kathpal, Bangalore (IN); Giridhar Appaji Nag Yasa, Bangalore (IN)

(73) Assignee: NETAPP, INC., Sunnyvale, CA (US)

( * ) Notice: Subject to any disclaimer, the term of this patent is extended or adjusted under 35 U.S.C. 154(b) by 335 days.

(21) Appl. No.: 14/164,028

(22) Filed: Jan. 24, 2014

(65) Prior Publication Data
US 2015/0212749 A1    Jul. 30, 2015

(51) Int. Cl.
*G06F 12/00*    (2006.01)
*G06F 3/06*    (2006.01)

(52) U.S. Cl.
CPC ............ *G06F 3/0619* (2013.01); *G06F 3/061* (2013.01); *G06F 3/065* (2013.01); *G06F 3/0659* (2013.01); *G06F 3/0686* (2013.01); *G06F 2003/0698* (2013.01)

(58) Field of Classification Search
None
See application file for complete search history.

(56) References Cited

U.S. PATENT DOCUMENTS 6,078,998 A * 6/2000 Kamel ................... G06F 3/061
                                                    711/111
2011/0066770 A1   3/2011 Kumar et al.

OTHER PUBLICATIONS

Hillyer B.K. et al., "Scheduling and Data Replication to Improve Tape Jukebox Performance", IEEE: Data Engineering, 1999, 532-541.
International Search Report for International Patent Application No. PCT/US2014/066589 (dated Feb. 18, 2015).
Prabhakar, S., et al., "Optimal Scheduling Algorithms for Tertiary Storage", Distributed and Parallel Databases: An International Journal, 14(3) pp. 1-34 (Nov. 2003).

* cited by examiner

*Primary Examiner* — Prasith Thammavong
*Assistant Examiner* — Jason Blust
(74) *Attorney, Agent, or Firm* — Nixon Peabody LLP; Anthony M. Duncan, Jr.

(57) ABSTRACT

A method, device and non-transitory computer readable medium that manages read access includes organizing a plurality of requests for objects on one or more storage media, such as tapes or spin-down disks, based on at least a deadline for each of the plurality of requests. One of one or more replicas for each of the objects on the one or more storage media is selected based on one or more factors. An initial schedule for read access is generated based at least on the deadline for each of the plurality of requests, the selected one of the replicas for each of the objects, and availability of one or more drives. The initial schedule for read access on the one or more of the drives for each of the plurality of requests for the objects is provided.

27 Claims, 8 Drawing Sheets

IO scheduling algorithm for PITA (PIO-LU)

- Input: Batch of objects, sorted based on deadlines O = {(O1,D1 ), (O2, D2), (O3, D3), ..}
- Output: Schedule of issuing read IOs to the tape media Algorithm Initialize: Schedule=[ ]

For objects in O:

ReplicaTimes=[ ]

RepLocs := *get_replica_locations*()
refers metadata to get the locations of all replicas for given object in the TG For item in RepLocs:

ReplicaTimes.append(*evaluate_replica_retrieval_times*()) #returns tuple (replica time, #load unloads, overall execution time) assuming placement of request on either (in order of priority) 1. drive serving request from same media or 2. least busy drive BestReplica := *choose_best_replica*(ReplicaTimes)
returns best replica, based on priority:
1. Min L/Us 2. Min. SLO violations 3. Min. schedule exec time Schedule.append(BestReplica)

Schedule = optimize_schedule(Schedule)
clusters requests based on media, to minimize same media being loaded multiple times return(Schedule)

FIG. 4

Table 1. LTO 5 characteristics

| Drive/Media Characteristic | Value |
|---|---|
| Native Data transfer rate | 140 MB/s |
| Rewind time from EOT | 47 seconds |
| Average load/unload time | 19 seconds |
| Capacity (uncompressed) | 1.5TB |
| Load/Unload cycles | 15000 - 20000 |

FIG. 5

|  | Serving data & performance | | Reliability of media | |
| --- | --- | --- | --- | --- |
|  | *Traditional Scheduling* | *SLO Aware Scheduling (This NIR)* | *Traditional Scheduling* | *SLO Aware Scheduling (This NIR)* |
| Local DAS | Applicable but SLO notion is absent | Applicable, takes care of SLOs | No reliability concerns | No reliability concerns |
| Networked Disks | Applicable but SLO notion is absent | Applicable, takes care of SLOs | No reliability concerns | No reliability concerns |
| Tape | Not useful, read performance would be poor | Necessary for proper functioning | Can degrade media very quickly | Handles media reliability carefully |
| Spun-down Disks | Not useful, read performance would be poor | Necessary for proper functioning | Can degrade media quickly | Handles media reliability carefully |

FIG. 6

Comparison of schedule execution times

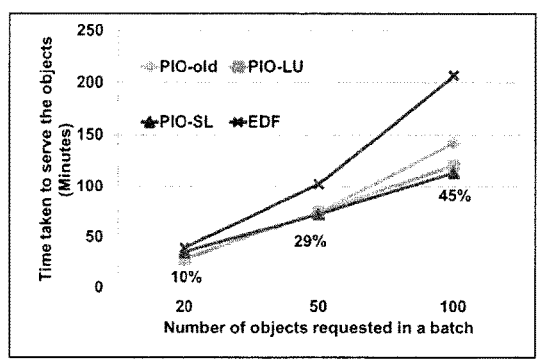

FIG. 7

Comparison of SLO violation times for different techniques

Comparison of number of media loaded by different IO scheduling techniques

How deduplication windows impact SLO violation times

METHODS FOR MANAGING READ ACCESS OF OBJECTS IN STORAGE MEDIA AND DEVICES THEREOF

This technology relates to methods for scheduling read access of objects in storage media and devices thereof.

BACKGROUND

An enterprise tape library apparatus with a plurality of tape drives is a data storage device that provide sequential storage of objects comprising items of data on different magnetic tapes. When a request for one of the objects is received, the corresponding magnetic tape must be identified, loaded on one of the tape drives and physically wound to read the object in the enterprise tape library apparatus. The tape drives have a very slow average seek times so proper scheduling of read access is essential to overcome the drawbacks with this type of storage. Unfortunately, current techniques for scheduling requests for read access of objects is often inefficient and slow and often are limited to a single storage media.

SUMMARY

A method that manages read access includes organizing with the data management computing device a plurality of requests for objects on one or more storage media based on at least a deadline for each of the plurality of requests. One of one or more replicas for each of the objects on the one or more storage media is selected with the data management computing device based on one or more factors.

An initial schedule for read access is generated with the data management computing device based at least on the deadline for each of the plurality of requests, the selected one of the replicas for each of the objects, and availabilty of one or more drives. The initial schedule for read access on the one or more of the drives for each of the plurality of requests for the objects is provided with the data management computing device.

A data management computing device includes at least one processor coupled to at least one memory and configured to execute programmed instructions stored in the memory including organizing a plurality of requests for objects on one or more storage media based on at least a deadline for each of the plurality of requests. One of one or more replicas for each of the objects on the one or more storage media is selected based on one or more factors. An initial schedule for read access is generated based at least on the deadline for each of the plurality of requests, the selected one of the replicas for each of the objects, and availabilty of one or more drives. The initial schedule for read access on the one or more of the drives for each of the plurality of requests for the objects is provided.

A non-transitory computer readable medium having stored thereon instructions for managing read access comprising executable code which when executed by a processor, causes the processor to perform steps including organizing a plurality of requests for objects on one or more storage media based on at least a deadline for each of the plurality of requests. One of one or more replicas for each of the objects on the one or more storage media is selected based on one or more factors. An initial schedule for read access is generated based at least on the deadline for each of the plurality of requests, the selected one of the replicas for each of the objects, and availabilty of one or more drives. The initial schedule for read access on the one or more of the drives for each of the plurality of requests for the objects is provided.

This technology provides a number of advantages including providing methods, non-transitory computer readable medium and devices for more optimized scheduling of read or IO access of replicated objects for high latency storage media, such as tapes and spin-down disks. This technology schedules read access by being cognizant of a deadline and a time-to-first-byte for each request. Additionally, this technology assures that once the first byte is available for an object, the rest of the data of that object will not incur any latency. Further with this technology the overall time taken to execute the schedule is optimized and a number of load/unload or power-up/power-down on the media are kept to a minimum to enhance reliability.

BRIEF DESCRIPTION OF THE DRAWINGS

FIG. 4 is an example of an algorithm for scheduling read access of objects in storage media;

FIG. 5 is a table of media characteristics for LTO-5 tape;

FIG. 6 is an exemplary table of advantages of this exemplary technology for scheduling read access of objects in storage media over prior scheduling technologies with different types of storage media;

FIG. 7 is a graph of an exemplary of scheduled execution times for four different exemplary techniques for read or IO access scheduling;

DETAILED DESCRIPTION

Figure 1:
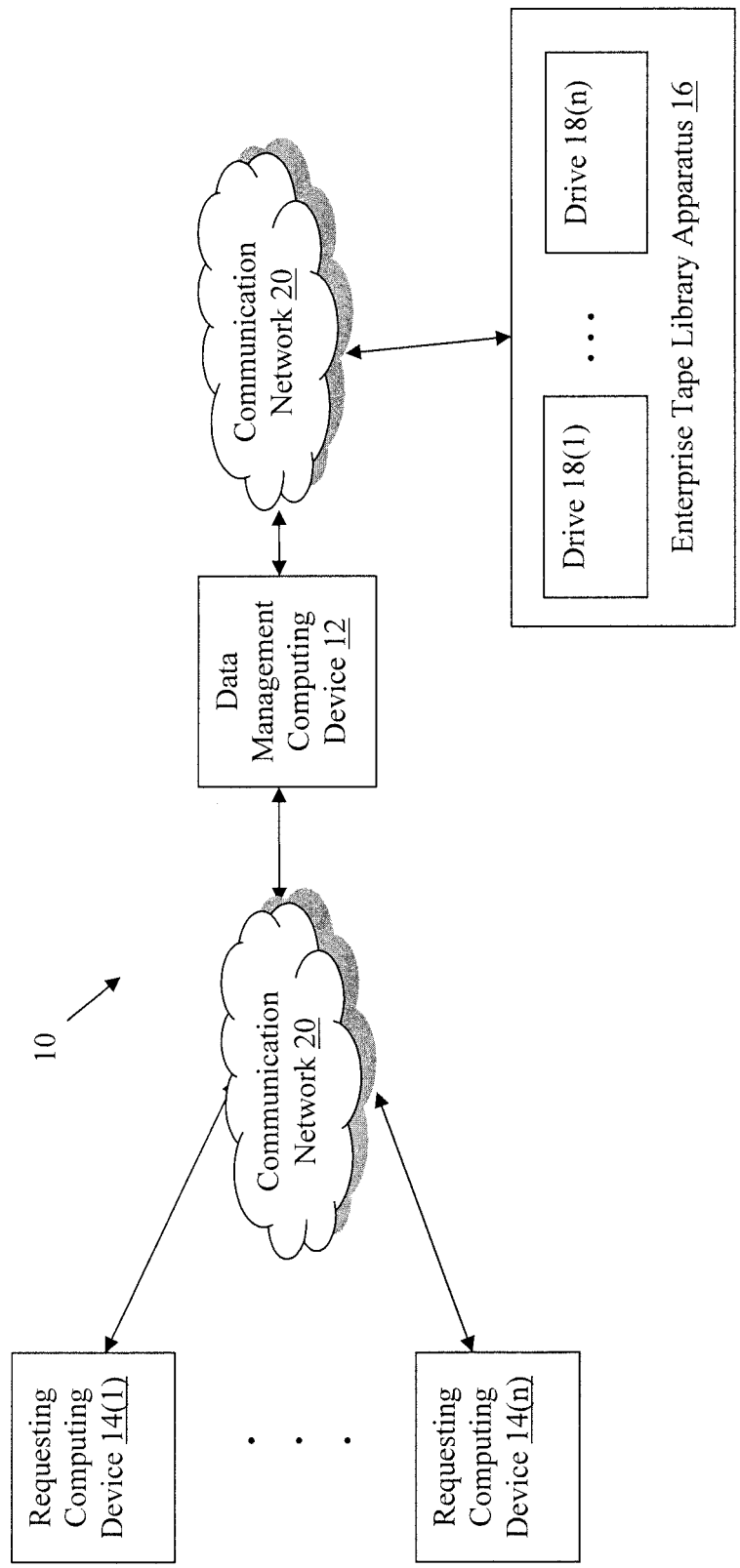
FIG. 1 is a block diagram of an environment with an exemplary data management computing device.
Figure 2:
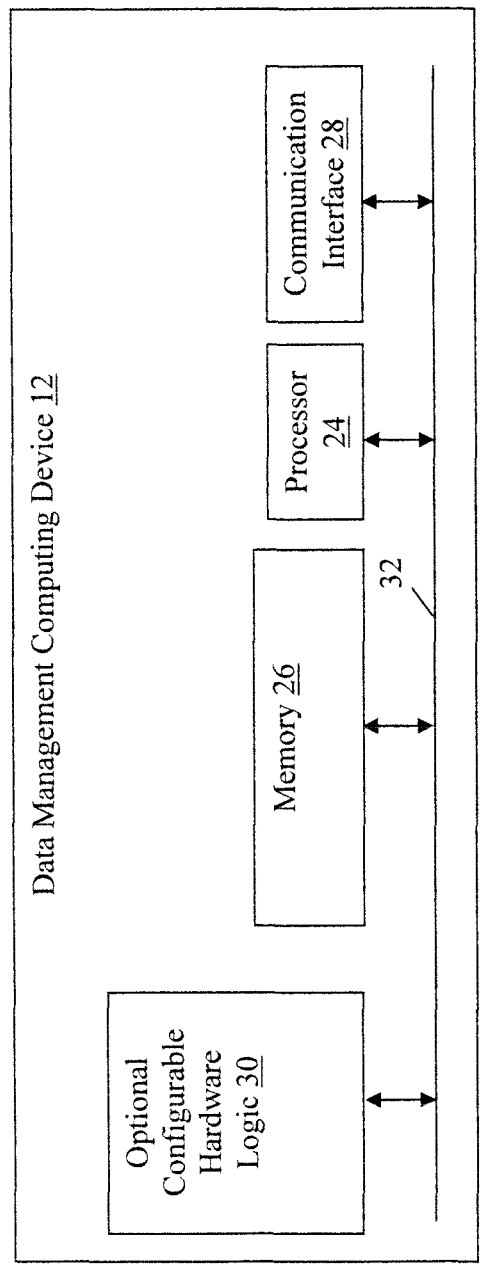
FIG. 2 is a block diagram of the exemplary data management computing device shown in FIG. 1.

An environment 10 with an exemplary data management computing device 12 is illustrated in FIGS. 1-2. In this particular example, the environment 10 includes the data management computing device 12, requesting computing devices 14(1)-14(n), enterprise tape library apparatus 16 with tape drives 18(1)-18(n), and communication networks 20, although the environment could include other types and numbers of systems, devices, components, and/or other elements in other configuration. The environment 10 may include other types and numbers of network systems, devices, and/or components, such as one or more routers and/or switches for example, as is generally known in the art and will not be illustrated or described herein. This technology provides a number of advantages including providing methods, non-transitory computer readable medium and devices for more optimized scheduling of read access of replicated objects for high latency storage media, such as tapes and spin-down disks.

Referring more specifically to FIGS. 1-2, the data management computing device 12 may perform a number of different types and numbers of functions and/or other operations, such as scheduling of read access of replicated objects by way of example only. The data management computing device 12 in this example includes a processor 24, a memory 26, a communication interface 28, and optionally configurable hardware logic 30, which are coupled together by a bus 32, although the data management computing device 12 may include other types and numbers of elements in other configurations.

The processor 24 of the data management computing device 12 may execute one or more programmed instructions stored in the memory 26 of the data management computing device 12 for the functions and/or other operations illustrated and described herein, including scheduling of read access of replicated objects by way of example only. The processor 24 of the data management computing device 12 may include one or more central processing units and/or general purpose processors with one or more processing cores, for example.

The memory 26 of the data management computing device 12 stores the programmed instructions for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 24, can be used for the memory 26.

The communication interface 28 of the data management computing device 12 operatively couples and communicates between the traffic management device 12, the requesting computing devices 14(1)-14(n), and enterprise tape library apparatus 16 with tape drives 18(1)-18(n), which are all coupled together by the communication networks 20, although other types and numbers of communication networks or systems with other types and numbers of connections and configurations to other devices and elements. By way of example only, the communication networks 20 can use TCP/IP over Ethernet and industry-standard protocols, including NFS, CIFS, SOAP, XML, LDAP, and SNMP, although other types and numbers of communication networks, can be used. The communication networks 20 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication networks 20 may also comprise any wide area network (e.g., Internet), although any other type of traffic network topology may be used.

The optional configurable hardware logic 30 of the data management computing device 12 may comprise specialized hardware configured to implement one or more steps of this technology as illustrated and described with reference to the examples herein. By way of example only, the configurable logic device 30 may comprise one or more of field programmable gate arrays (FPGAs), field programmable logic devices (FPLDs), application specific integrated circuits (ASICs), and/or programmable logic units (PLUs), for example, configured to implement one or more steps of this technology as illustrated and described with reference to the examples herein.

Each of the requesting computing devices 14(1)-14(n) may include a processor, a memory, and a communication interface, which are coupled together by a bus or other link, although each of these devices could have other types and numbers of other components and other types of network devices could be used. The requesting computing devices 14(1)-14(n) may request objects from the enterprise tape library apparatus 20, although the requesting computing devices 14(1)-14(n) may perform other types and numbers of other functions and/or other operations.

The enterprise tape library apparatus 20 may include a processor, a memory, a communication interface, and tape drives 18(1)-18(n) which are coupled together by a bus or other link, although the enterprise tape library apparatus 20 could have other types and numbers of other components. The memory in the enterprise tape library apparatus 20 may include replicas of objects stored in one or more storage media which can be access by the enterprise tape library apparatus 20 with one or more of the tape drives 18(1)-18(n). Although tape drives 18(1)-18(n) are illustrated and described in this example, other types of drives for JO access of the storage media could be used.

Although the exemplary network environment 10 with the traffic management device 12, requesting computing devices 14(1)-14(n), enterprise tape library apparatus 20 with one or more of the tape drives 18(1)-18(n), and communication networks 20 are described and illustrated herein, other types and numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 3A:
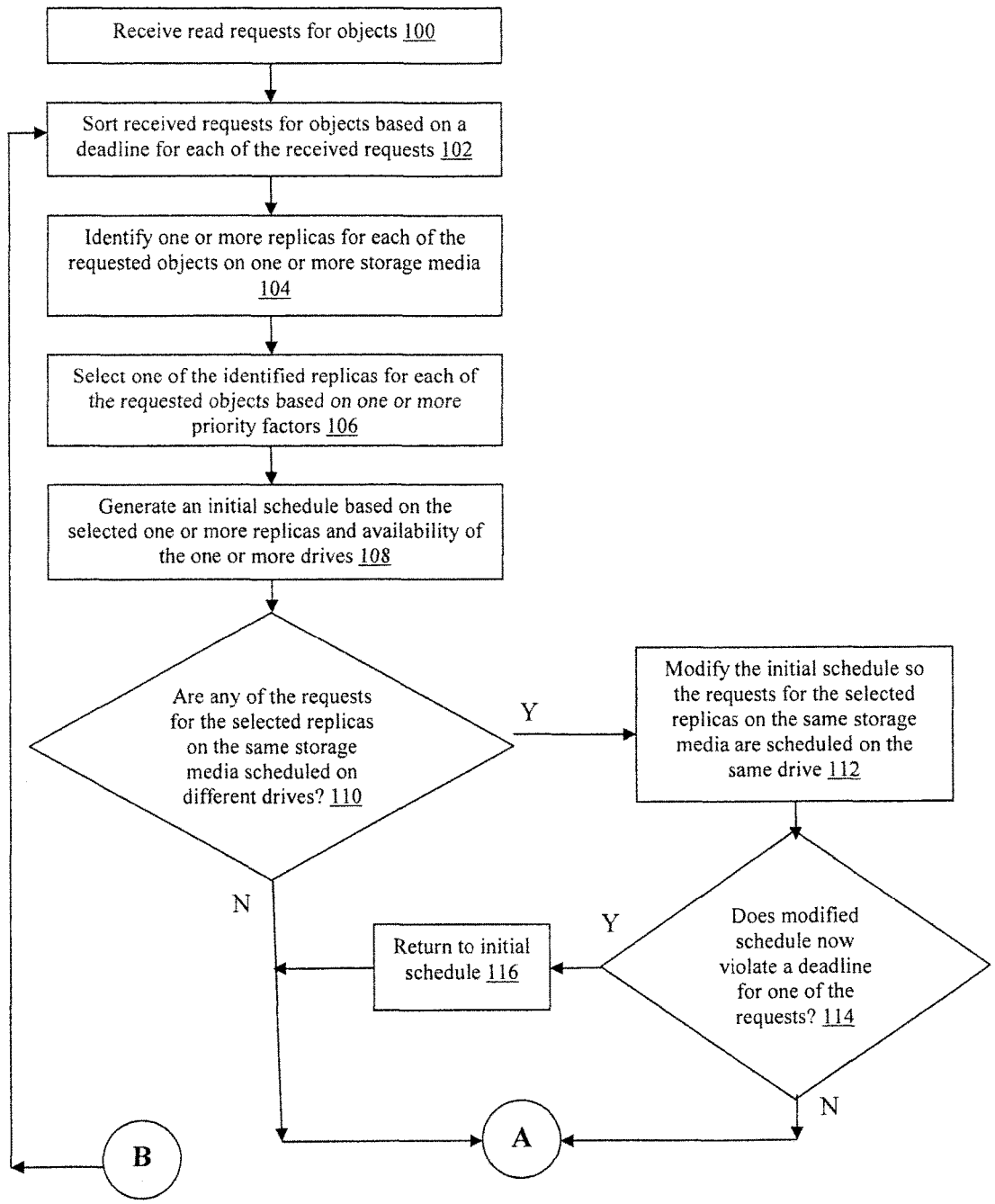
FIGS. 3A-3B are a flow charts of an exemplary method for scheduling read access of objects in storage media.
Figure 3B:
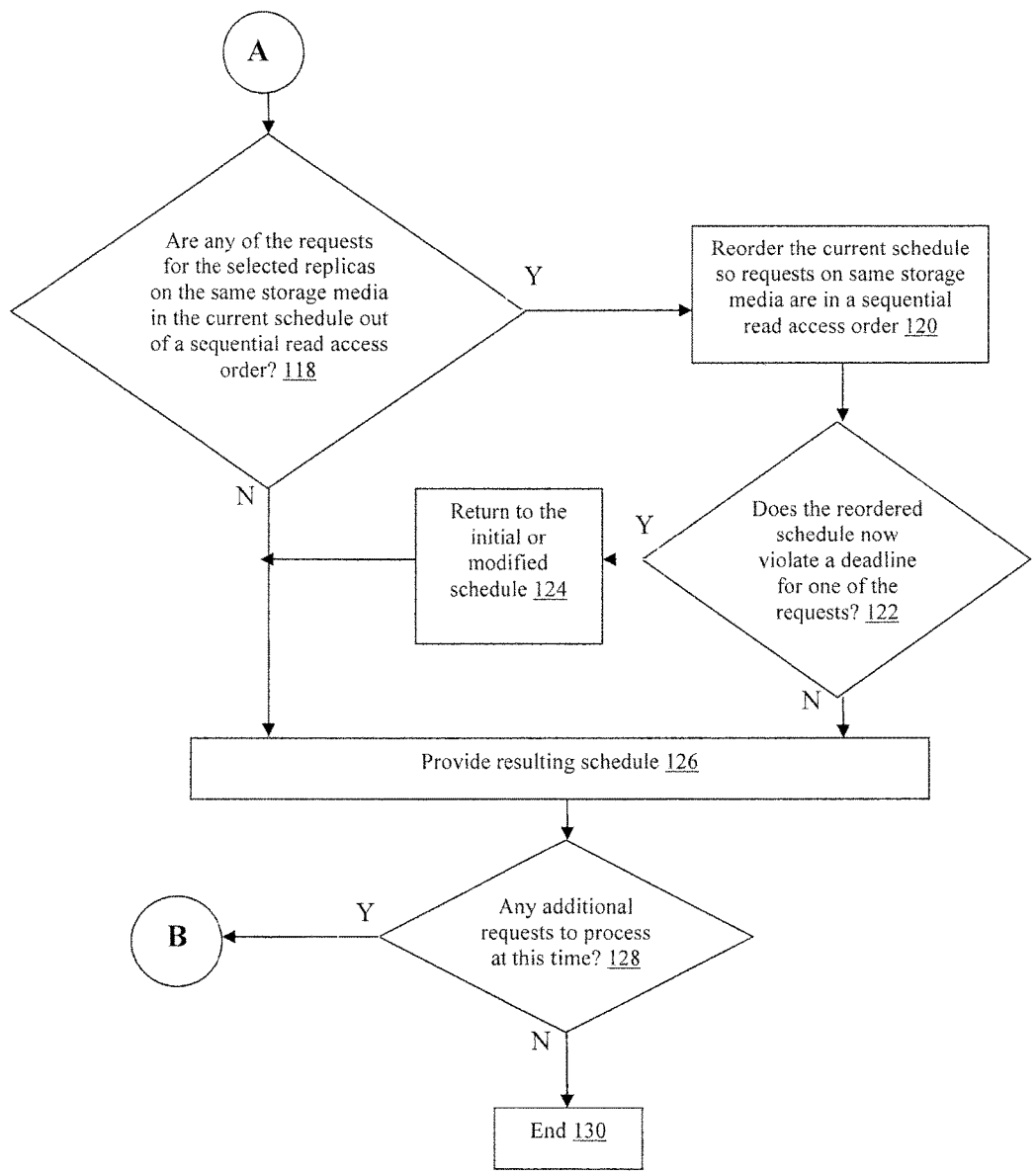

An exemplary method for scheduling read access of objects in storage media will now be described with reference to FIGS. 1-3B. Referring more specifically to FIG. 3A, in step 100 in this example, the data management computing device 12 receives read requests for objects.

In step 102, the data management computing device 12 sorts the received requests for read access of objects from one or more of the requesting computing devices 14(1)-14(n) based on a deadline or other service level objective (SLO) for each of the received requests, although the data management computing device 12 could sort the received requests based on other types and numbers factors, such as a time to execution of each of the requests.

In step 104, the data management computing device 12 identifies one or more replicas for each of the requested objects on one or more storage media in the enterprise tape library apparatus 16, although other types of storage media in other locations can be used. Next, in step 106, the data management computing device 12 selects one of the identified replicas for each of the requested objects based on a minimum load and unload time for the identified replicas, a minimum number of violations of the deadlines for the plurality of requests, or a minimum read execution time for the identified replicas, although other types and numbers of factors could be used.

In step 108, the data management computing device 12 generates an initial schedule based on the selected one or more replicas for each of the plurality of requests and availability of the one or more drives 18(1)-18(n) in the enterprise tape library 16. By way of example only, when generating the initial schedule, the data management computing device 12 may schedule the execution of any of the requests belonging to a new one of the storage media, i.e. a media not already scheduled at that time on one of the drives 18(1)-18(n), on another one of the available and unused drives 18(1)-18(n), otherwise, the next request is scheduled on the one of the drives 18(1)-18(n) that would become free the soonest.

In step 110, the data management computing device 12 determines if any of the requests for the selected replicas are on the same storage media are scheduled on different ones of the drives 18(1)-18(n) in the initial schedule. If the data management computing device determines none of the requests for the selected replicas are on the same storage media and also scheduled on different ones of the drives 18(1)-18(n), then the No branch is taken to step 118 as illustrated and described in greater detail herein.

If the data management computing device determines two or more of the requests for the selected replicas are on the same storage media and also are scheduled on different ones of the drives 18(1)-18(n), then the Yes branch is taken to step 112. In step 112, the data management computing device 12 modifies the initial schedule so the requests for the selected replicas on the same storage media are scheduled on the same one of the drives 18(1)-18(n) to generate a modified schedule.

In step 114, the data management computing device 12 determines if the modified schedule violates a deadline for any of the plurality of requests. If the data management computing device 12 determines the modified schedule violates a deadline for any of the plurality of requests, then the Yes branch is taken to step 116, although other threshold numbers for how many deadlines need to be violated to trigger the Yes branch could be used. In step 116, the data management computing device 12 returns to the initial schedule, although the data management computing device 12 could perform other types and numbers of other operations to modify the schedule to minimize or eliminate deadline violations in the modified schedule. If in step 114, the data management computing device 12 determines the modified schedule does not violates a deadline for any of the plurality of requests, then the No branch is taken to step 118 in FIG. 3B.

In step 118, the data management computing device 12 determines if any of the requests for the selected replicas on the same storage media in the current schedule are out of a sequential read access order. If the data management computing device 12 determines none of the requests for the selected replicas on the same storage media in the current schedule are out of a sequential read access order, then the No branch is taken to step 126 as illustrated and described in greater detail herein.

If in step 118 the data management computing device 12 determines two or more of the requests for the selected replicas on the same storage media in the current schedule are out of a sequential read access order, then the Yes branch is taken to step 120. In step 120, the data management computing device 12 reorders the current schedule, which is either the initial schedule or the modified schedule depending on the prior branches was taken to step 118, so requests on the same storage media are in a sequential read access order.

In step 122, the data management computing device 12 determines if the reordered schedule determines violates a deadline for any of the plurality of requests. If the data management computing device 12 determines the reordered schedule violates a deadline for any of the plurality of requests, then the Yes branch is taken to step 124, although other threshold numbers for how many deadlines need to be violated to trigger the Yes branch could be used. In step 124, the data management computing device 12 returns to the prior schedule, which is either the initial schedule or the modified schedule depending on the prior branches was taken to step 118, although the data management computing device 12 could perform other types and numbers of other operations to reorder the schedule to minimize or eliminate deadline violations in the reordered schedule.

If in step 122, the data management computing device 12 determines the reordered schedule does not violate a deadline for any of the plurality of requests, then the No branch is taken to step 126. In step 126, the data management computing device 12 provides the resulting schedule for execution of the read access of the plurality of requests for the selected replicas in the enterprise tape library apparatus 16.

In step 128, the data management computing device 12 may determine if there any additional requests to process while the resulting schedule is being executed. If the data management computing device 12 determine there additional requests to process and these additional requests would not violate a deadline for any of the current request being executed in the resulting schedule, then the Yes branch can be taken back to step 102 as illustrated and described earlier. If the data management computing device 12 determine there no additional requests to process, then this example of the method may end at step 130.

By way of example only, an example of stored programmed instructions for an algorithm for this exemplary method for scheduling read access of objects in storage media, i.e. tape media in this example, is illustrated in FIG. 4. This example of the algorithm takes into account the limited duty cycles of tape media and gives a minimum number of load/unload cycles of the tape media a top priority. Additionally this algorithm uses the deadlines or SLOs of the requests for the objects to identify which tape media should be loaded first and then subsequently.

This technology also is able to optimize scheduling by taking into account the particular characteristics associated with the tape media in this example, such as load/unload delay of tape media, seek latency, rewind latency and limited duty cycles. An exemplary table of the media characteristics for LTO-5 tape is illustrated in FIG. 5. Further examples of the advantages of this deadline or SLO aware scheduling technology over prior scheduling technologies with different types of storage media is illustrated in the table in FIG. 6.

By way of example only, exemplary results from four different techniques for read or IO access scheduling: (1) earliest deadline first (EDF) algorithm which has been modified as taught by his technology to be replica aware, such that the best replica to meet the required deadline is used; (2) Primary Integrated Tape Archive Load/Unload (PIO-LU) algorithm in accordance with an example of this technology and is shown in FIG. 4 sets the highest priority to less consumption of duty cycles, while still striving to meet deadline or SLOs; (3) PIO-old algorithm is the same as PIO-LU, except that it does not take the limited duty cycles for tape media into account; and (4) Primary Integrated Tape Archive Single Load (PIO-SL) algorithm is another variation of PIO-LU that allows a maximum of one load/unload for a given tape media, during execution of a given batch or plurality of requests is described below with reference to FIGS. 7-10.

The workload for the experiments to illustrate the four techniques described above was generated synthetically, with an average object size of 64 MB, a compression group size of 1 GB, and assumed availability of sixteen tape drives. Each object was replicated to three TapePlexes (TPs), randomly spread across two to eight tapes with-in a TP and further spread into 16 compression groups within a tape. A twenty minutes average (10-30 minutes range) deadline for each object was set. The results for IO scheduling were averaged over ten sample runs. With respect to compression groups, by way of example only, data blocks can be collected to create a compression group and once the group is formed a test can be done to see if the data is compressible before storage on the disk drives. If the test says that the collected data blocks can be compressed then the data blocks are stored in a compressed form on the disk.

Figure 8:
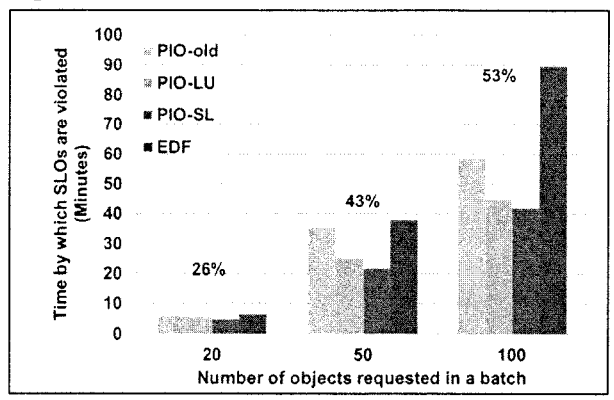
FIG. 8 is a graph of an exemplary of deadline or SLO violation times for four different exemplary techniques for read or IO access scheduling.
Figure 9:
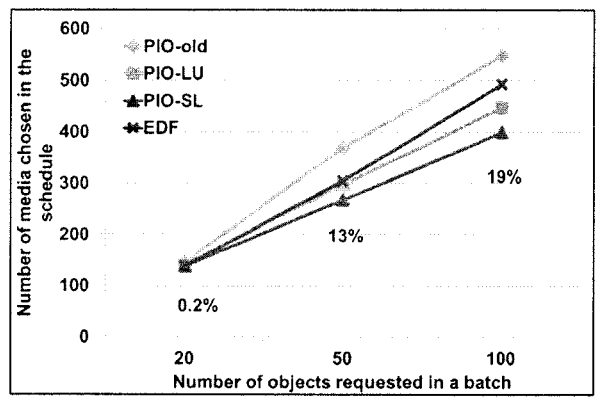
FIG. 9 is a graph of an exemplary comparison of a number of media loaded by four different exemplary techniques for read or IO access scheduling.

Referring more specifically to FIGS. 7 and 8, these figures show that all variants of PIO perform better than EDF. FIG. 9 shows that a schedule returned by EDF is able to serve all requests by loading a lesser number of tape media than with PIO-old. This is because PIO-old does not optimize on the number of media loads while returning a schedule. However, on addition of the heuristic of ensuring minimum media loads while still trying to meet the deadlines or SLOs, the resultant PIO-LU algorithm does better than EDF. This result is further bettered by PIO-SL algorithm as it has the restriction of loading least possible set of media in order of priority of SLOs for meeting the requests. In FIGS. 7-9, the % numbers in bold show how much better PIO-SL does when compared to EDF.

Figure 10:
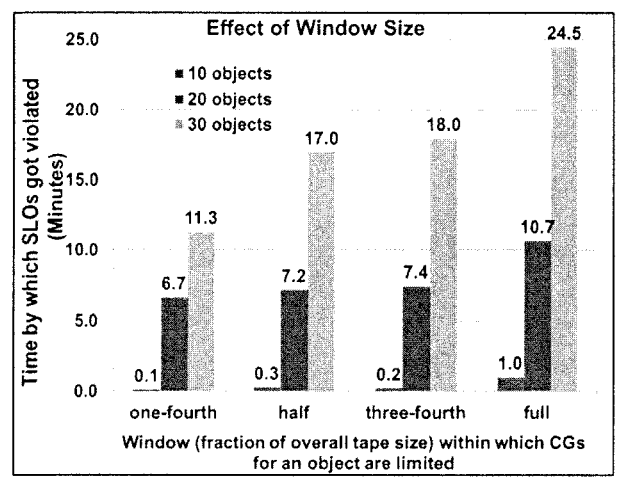
FIG. 10 is a graph of an example of how deduplication windows impact deadline or SLO violation times.

Referring to FIG. 10, this graph illustrates how deduplication window size affects execution times for PIO schedules. In this set of experiments, objects were limited within specific regions of the tape media. Each of these regions was chosen to be closer to the end of tape to get worse case performance numbers. Limiting objects to a specific region, helped simulate the effect of windowed deduplication on PIO. As shown in this graph, the deadline or SLO violation times maxed out if the deduplication span is equal to the entire tape. Having a more limited deduplication window size or span, helps to schedule IOs with lower delays due to seeks. For sequential access media, like tapes where seek latencies are high, such windowed deduplication is very effective from performance point of view. As a result, the data management computing device 12 may optional further generate the schedule of read or IP access based on the selected size of the deduplication window.

Accordingly, as illustrated and described with the examples herein this technology provides a number of advantages including providing methods, non-transitory computer readable medium and devices for more optimized scheduling of read or IO access of replicated objects for high latency storage media, such as tapes and spin-down disks. This technology is able to optimize scheduling by taking into account the constraints of the storage media, such as load/unload delay of tape media, seek latency, rewind latency and limited duty cycles. Additionally, this technology for optimizing scheduling utilizes identifying and selecting replicas to improve performance. Further, this technology is able to optimize scheduling to minimize or eliminate the shoe-shine effect.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
  organizing, with a computing device, a plurality of requests for objects located on one or more storage media based on at least a deadline for each of the plurality of requests;
  selecting, with the computing device, one of one or more replicas for each of the requested objects located on the one or more storage media based on a minimum number of violations of deadlines for the plurality of requests;
  generating, with the computing device, an initial schedule for read access based at least on the selected replicas for each of the requested objects, and availability of at least one of the one or more storage media; and
  providing, with the computing device, the initial schedule for read access on the at least one of the one or more storage media for each of the plurality of requests for the objects.

2. The method as set forth in claim 1 further comprising identifying, with the computing device, the one or more of the replicas for each of the objects on the one or more storage media.

3. The method as set forth in claim 1 further comprising selecting, with the computing device, one of one or more replicas for each of the objects on the one or more storage media based on a minimum load and unload time or a minimum read execution time.

4. The method as set forth in claim 1 further comprising:
  determining, with the computing device, when two or more of the selected replicas in the initial schedule are selected on different ones of the storage media and have corresponding replicas available on the same one of the storage media; and
  modifying, with the computing device, the initial schedule so the selection of the determined two or more replicas are changed to the corresponding replicas available on the same one of the storage media.

5. The method as set forth in claim 4 further comprising:
determining, with the computing device, when the modified schedule would violate the deadline for any request in the plurality of requests;
wherein if the modified schedule violate the deadline for any request in the plurality of requests, providing the initial schedule for read access; and
wherein if the modified schedule does not violate the deadline for any request in the plurality of requests, providing the modified schedule.

6. The method as set forth in claim 5, further comprising:
determining, with the computing device, when two or more of the selected replicas on the same one of the storage media are on either the initial schedule or the modified schedule is in an access order which is not sequential; and
reordering, with the computing device, either the initial schedule or the modified schedule so the two or more of the selected replicas on the same one of the storage media are in an access order which is sequential.

7. The method as set forth in claim 6 further comprising:
determining, with the computing device, when the reordered schedule would violate the deadline for any request in the plurality of requests;
wherein if the reordered schedule violate the deadline for any request in the plurality of requests, providing either the initial schedule or the modified schedule for read access; and
wherein if the reordered schedule does not violate the deadline for any request in the plurality of requests, providing the reordered schedule.

8. The method as set forth in claim 1 wherein generating the initial schedule further comprises generating, with the computing device, the initial schedule for read access of the plurality of requests on the at least one of the storage media based on a single load of each of the one or more storage media needed for the plurality of requests.

9. The method as set forth in claim 1, wherein generating the initial schedule further comprises generating, with the computing device, the initial schedule for read access of the plurality of requests on the at least one storage media based on use of deduplication window.

10. A computing device, comprising:
at least one processor;
at least one memory coupled to the processor configured to execute programmed instructions stored in the memory, comprising:
  organizing a plurality of requests for objects located on one or more storage media based on at least a deadline for each of the plurality of requests;
  selecting one of one or more replicas for each of the requested objects located on the one or more storage media based on a minimum number of violations of deadlines for the plurality of requests;
  generating an initial schedule for read access based at least on the selected replicas for each of the requested objects, and availability of at least one of the one or more storage media; and
  providing the initial schedule for read access on the at least one of the one or more storage media for each of the plurality of requests for the objects.

11. The device as set forth in claim 10 wherein the processor is further configured to execute programmed instructions stored in the memory further comprising identifying the one or more of the replicas for each of the objects on the one or more storage media.

12. The device as set forth in claim 10 further comprising selecting, with the computing device, one of one or more replicas for each of the objects on the one or more storage media based on a minimum load and unload time or a minimum read execution time.

13. The device as set forth in claim 10 wherein the processor is further configured to execute programmed instructions stored in the memory further comprising:
determining when two or more of the selected replicas in the initial schedule are selected on different ones of the storage media and have corresponding replicas available on the same one of the storage media; and
modifying the initial schedule so the selection of the determined two or more replicas are changed to the corresponding replicas available on the same one of the storage media.

14. The device as set forth in claim 13 wherein the processor is further configured to execute programmed instructions stored in the memory further comprising:
determining when the modified schedule would violate the deadline for any request in the plurality of requests;
wherein if the modified schedule violate the deadline for any request in the plurality of requests, providing the initial schedule for read access; and
wherein if the modified schedule does not violate the deadline for any request in the plurality of requests, providing the modified schedule.

15. The device as set forth in claim 14 wherein the processor is further configured to execute programmed instructions stored in the memory further comprising:
determining when two or more of the selected replicas on the same one of the storage media are on either the initial schedule or the modified schedule is in an access order which is not sequential; and
reordering either the initial schedule or the modified schedule so the two or more of the selected replicas on the same one of the storage media are in an access order which is sequential.

16. The device as set forth in claim 15 wherein the processor is further configured to execute programmed instructions stored in the memory further comprising:
determining when the reordered schedule would violate the deadline for any request in the plurality of requests;
wherein if the reordered schedule violate the deadline for any request in the plurality of requests, providing either the initial schedule or the modified schedule for read access; and
wherein if the reordered schedule does not violate the deadline for any request in the plurality of requests, providing the reordered schedule.

17. The device as set forth in claim 10 wherein the processor is further configured to execute programmed instructions stored in the memory for generating the initial schedule further comprises generating the initial schedule for read access of the plurality of requests on the at least one storage media based on a single load of each of the one or more storage media needed for the plurality of requests.

18. The device as set forth in claim 10 wherein the processor is further configured to execute programmed instructions stored in the memory for the generating the initial schedule further comprising generating the initial schedule for read access of the plurality of requests on the at least one storage media based on use of deduplication.

19. A non-transitory computer readable medium having stored thereon instructions comprising executable code which when executed by a processor, causes the processor to perform steps comprising:

organizing a plurality of requests for objects located on one or more storage media based on at least a deadline for each of the plurality of requests;

selecting one of one or more replicas for each of the requested objects located on the one or more storage media based on a minimum number of violations of deadlines for the plurality of requests;

generating an initial schedule for read access based at least on the selected replicas for each of the requested objects, and availability of at least one of the one or more storage media; and providing the initial schedule for read access on the at least one of the one or more storage media for each of the plurality of requests for the objects.

20. The medium as set forth in claim 19 further comprising identifying the one or more of the replicas for each of the objects on the one or more storage media.

21. The medium as set forth in claim 19 further comprising selecting, with the computing device, one of one or more replicas for each of the objects on the one or more storage media based on a minimum load and unload time or a minimum read execution time.

22. The medium as set forth in claim 19 further comprising:

determining when two or more of the selected replicas in the initial schedule are selected on different ones of the storage media and have corresponding replicas available on the same one of the storage media; and modifying the initial schedule so the selection of the determined two or more replicas are changed to the corresponding replicas available on the same one of the storage media.

23. The medium as set forth in claim 22 further comprising:

determining when the modified schedule would violate the deadline for any request in the plurality of requests;

wherein if the modified schedule violate the deadline for any request in the plurality of requests, providing the initial schedule for read access; and wherein if the modified schedule does not violate the deadline for any request in the plurality of requests, providing the modified schedule.

24. The medium as set forth in claim 23 further comprising:

determining when two or more of the selected replicas on the same one of the storage media are on either the initial schedule or the modified schedule is in an access order which is not sequential; and reordering either the initial schedule or the modified schedule so the two or more of the selected replicas on the same one of the storage media are in an access order which is sequential.

25. The medium as set forth in claim 24 further comprising:

determining when the reordered schedule would violate the deadline for any request in the plurality of requests;

wherein if the reordered schedule violate the deadline for any request in the plurality of requests, providing either the initial schedule or the modified schedule for read access; and wherein if the reordered schedule does not violate the deadline for any request in the plurality of requests, providing the reordered schedule.

26. The medium as set forth in claim 19 wherein generating the initial schedule further comprises generating the initial schedule for read access of the plurality of requests on the at least one storage media based on a single load of each of the one or more storage media needed for the plurality of requests.

27. The medium as set forth in claim 19 wherein the generating the initial schedule further comprises generating the initial schedule for read access of the plurality of requests on the at least one storage media based on use of deduplication.

* * * * *